(12) United States Patent
Thingbø et al.

(10) Patent No.: US 6,680,472 B1
(45) Date of Patent: Jan. 20, 2004

(54) DEVICE FOR MEASURING OF OPTICAL WAVELENGTHS

(75) Inventors: Dag Thingbø, Vikhamar (NL); Jon Thomas Kringlebotn, Trondheim (NL)

(73) Assignee: Optoplan AS, Trondheim (NR)

( * ) Notice: Subject to any disclaimer, the term of this patent is extended or adjusted under 35 U.S.C. 154(b) by 0 days.

(21) Appl. No.: 10/070,735

(22) PCT Filed: Sep. 7, 2000

(86) PCT No.: PCT/NO00/00292
§ 371 (c)(1),
(2), (4) Date: Mar. 12, 2002

(87) PCT Pub. No.: WO01/22046
PCT Pub. Date: Mar. 29, 2001

(30) Foreign Application Priority Data
Sep. 15, 1999 (NO) ............................ 19994473

(51) Int. Cl.$^7$ .................. G01J 5/08; G01J 1/34; G01N 21/25; G02F 1/01; G02F 1/295
(52) U.S. Cl. .................... 250/227.12; 250/227.14; 250/227.23; 250/227.21; 385/10; 385/1; 385/42
(58) Field of Search ............. 250/227.23, 227.21, 250/227.12, 227.14, 227.18; 359/110, 124, 127, 130, 140; 385/10, 12, 37, 1, 3, 42

(56) References Cited

U.S. PATENT DOCUMENTS

| | | | |
|---|---|---|---|
| 4,897,543 A | | 1/1990 | Kersey |
| 4,932,783 A | | 6/1990 | Kersey et al. |
| 4,996,419 A | * | 2/1991 | Morey |
| 5,104,222 A | | 4/1992 | Kersey et al. |
| 5,173,743 A | | 12/1992 | Kim |
| 5,410,404 A | | 4/1995 | Kersey et al. |
| 6,097,487 A | * | 8/2000 | Kringlebotn |
| 6,233,373 B1 | * | 5/2001 | Atkins et al. |
| 6,304,696 B1 | * | 10/2001 | Patterson et al. |
| 6,525,308 B1 | * | 2/2003 | Schmidt-Hattenberger |

FOREIGN PATENT DOCUMENTS

| | | |
|---|---|---|
| GB | 2 268581 A | 1/1994 |
| GB | 2 332 272 A | 6/1999 |
| WO | WO 98/36252 A1 | 8/1998 |
| WO | WO 98/36252 | * 8/1998 |

OTHER PUBLICATIONS

A.D. Kersey, et al., "Elimination of Polarization Induced Signal Fading in Interferometric Fiber Sensors Using input Polarization Control", *Optical Fiber Sensors 1988. Technical Digest Series*, 1988, pp. 44–47, vol. 2, Conference Edition, Washington, Opt. Soc. America.

X. Zhou, et al., "Polarization Fading Elimination of Inter-ferometric Fiber–Optic Arrays by Input–Polarization Control", *Proceeding of SPIE—The International Society for Optical Engineering Conference*, Jul. 1998, pp. 385–392, vol. 3478, SPIE–Int. Soc. Opt. Eng., Washington DC.

* cited by examiner

Primary Examiner—David Porta
Assistant Examiner—David C. Meyer
(74) Attorney, Agent, or Firm—Rothwell, Figg, Ernst & Manbeck

(57) ABSTRACT

Fibre optic apparatus for accurate and repeatable measurements of light comprising one or more wavelength ranges, and system employing the apparatus. The apparatus according to the invention comprises: a directional coupler adapted to lead the light into an optical fibre, said optical fibre containing at least one analysis filter for each wavelength range, said analysis filters consisting of at least one fibre-optical Bragg-grating (FBG) which reflects incident light with a chosen wavelength back through said directional coupler and onto a detector having an associated signal processing unit, a modulator device for pulsing the incident light with a chosen pulse width, and an optical fibre delay line in front of each analysis filter, with a length adapted to provide for a sufficient time delay larger than the pulse width, so that the pulses reflected from each analysis filter at different wavelengths can be separated in time and thereby be demodulated in the signal processing unit.

10 Claims, 4 Drawing Sheets

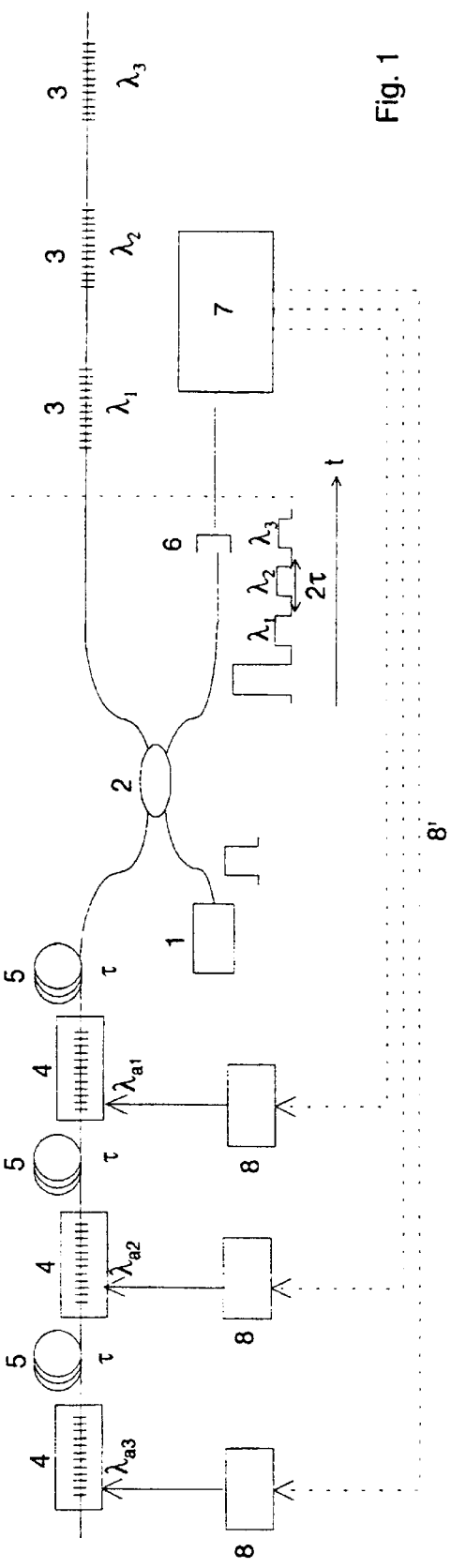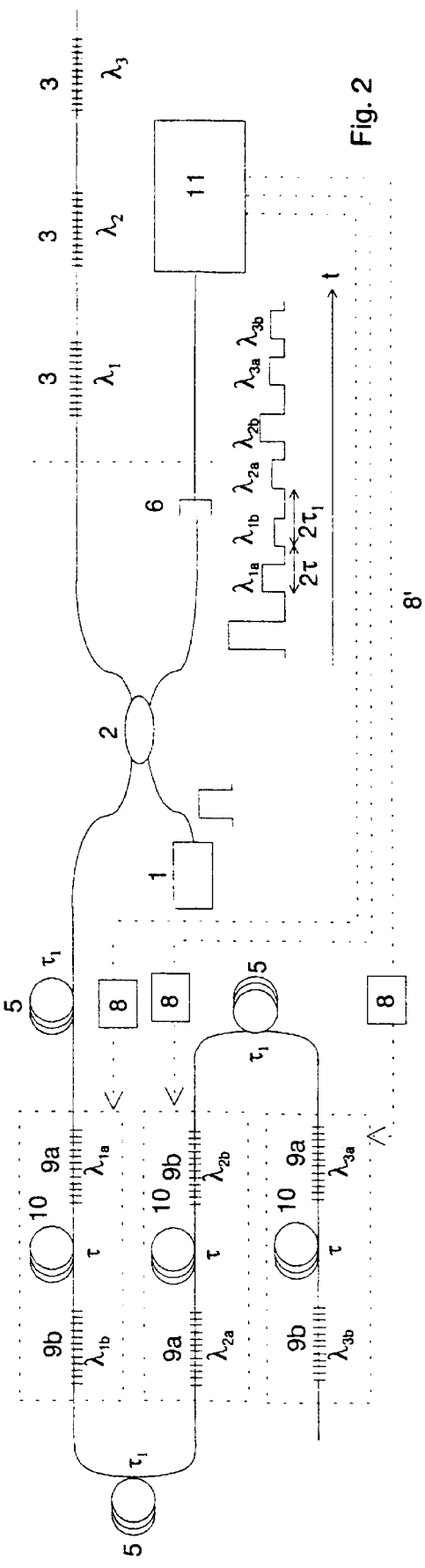

DEVICE FOR MEASURING OF OPTICAL WAVELENGTHS

BACKGROUND OF THE INVENTION

1. Field of the Invention

This invention relates to a simple device for accurate and repeatable measurements of optical wavelengths, especially Bragg wavelengths for fiberoptic Bragg gratings and wavelengths, as well as laser effect and signal/noise ratios for each laser in a wavelength multiplexed communication system.

2. Description of the Related Art

A fiberoptic Bragg grating (FBG) is a permanent, photo-induced periodic modulation of the refractive index in the core of an optical fiber which reflect light within a narrow wavelength area centred around the Bragg wavelength, It is known that an FBG, though measuring of the Bragg wavelength may be used to detect an arbitrary perturbation, such as temperature or strain (by the location of the fiber grating), which changes the physical period of the modulation in the refractive index and/or the effective refractive index as seen by the light propagating along the fiber grating, and thus the Bragg wavelength. An important property of the FBG sensors is that the reflected Bragg wavelength from a Bragg sensor element, with precise calibration, is an absolute measure of the amplitude of the perturbation(s) in the fiber grating. In sensor uses in which for example temperature or strain is measured, the Bragg wavelength, being in the range of 1 $\mu$m, must be measured with a resolution, accuracy and repeatability of approx. 1 pm, which is only 0.3–1% of the reflection bandwidth of the fiber grating. With a typical Bragg wavelength of 1.55 $\mu$m a shift in the Bragg wavelength being 1 pm will correspond to a change in stretch or temperature of 1 $\mu$m or 0.1° C., respectively.

Another important property of the FBG sensor is that many FBG sensors may be multiplexed along one or more optic fibres by writing the fiber gratings with different Bragg wavelengths which does not overlap during sensor operation, to obtain quasi-distributed measurements with FBG sensor elements position at arbitrary positions at distances from a few millimeters to tens of kilometers.

U.S. Pat. No. 4,994,419 shows an example of time multiplexing by using one in a number of sensor gratings along the same fiber as a method for having a large number of gratings along one fiber being independent of wavelength area being allocated to each sensor. The distance between each sensor should be relatively large, large enough to separate the reflected pulses in time (typically >10 m, corresponding to 0.1 ps delay). The reflected pulses from each grating is in the figure reflected from an analysis grating which may be biased to overlap each sensor grating within the time window of this sensor grating. The wavelengths of the sensor gratings are approximately equal, but it is advantageous if they are slightly different so that multiple reflection and thus cross talk is reduced. The grating wavelengths may overlap, which makes the system unsuitable for use in a wavelength multiplexed system or for measuring optical wavelengths.

It is known that one or more FBG sensor wavelengths may be measured using a broadband source, e.g. a light emitting diode (LED) or a super luminescent fiber source (SFK) in combination with an adjustable optical filter, for example an adjustable Fabry-Perot (F-P) filter controlled by a piezoelectric transducer (PZT) [Kersey, A. D., Berkoff, T. A., and Morey, W. W., "Multiplexed fiber Bragg grating strain-sensor system with a fiber Fabry-Perot wavelength filter," Optics Letters, Vol. 18, s. 1370–1372, 1993), or, as an alternative, an adjustable laser source, for example an external cavity semiconductor laser with an external adjustable FBG reflector [U.S. Pat. No. 5,401,956], if the spectrum of the laser covers all the possible FBG sensor wavelengths. These techniques makes simultaneous wavelength, demultiplexing and demodulation (exact determination of wavelength) possible for several different FBG sensors. To obtain accurate, repeatable wavelength measurements with these techniques a reference system may be used based on a fixed Fabry-Perot filter and a reference filter with separate detector channels [Norwegian patent application 1997.0674). A disadvantage with such a system is the relatively large component and production costs.

A simpler and less expensive system for reading the wavelength of an FBG filter is based on a broadband source and an optical flank filter [U.S. Pat. No. 5,319,435], where the reflected light from an FBG is split through a fiberoptic coupler and where a part of the light is sent through a flank filter, a shift in the Bragg wavelength thus resulting in a change in the transmitted power, and to a detector, while another part is sent directly to another detector. The ratio between the detector signals is a unambiguous measure of the Bragg wavelength. Such a system has a fast time response, but is not suitable for wavelength multiplexing of several sensors along the same fiber, will usually be polarized and is sensitive to temperature changes in the flank filter. A related technique is based on the use of two adjustable FBGs with partial spectral overlapping as receiving filter where the Bragg wavelength in one FBG sensor will be on the flank of the two receiving grating each reflecting light to one detector, so that the ratio between the detector signals will be a measure of the Bragg Wavelength [U.S. Pat. No. 5,410,404]. This technique provides good time response and uses inexpensive components, but has the disadvantage that it, in addition to two gratings requires three couplers and two detectors for each sensor channel.

Use of several couplers gives optical loss and thus reduced signal. For four wavelength multiplexed sensors along one fiber 15 couplers and 8 detectors are required, in addition to 8 receiver gratings.

Another FBG sensor readout technique being based on the use of adjustable gratings is described in UK patent application GB 2268581 A and U.S. Pat. No. 5,397,891. For each sensor grating there is a receiver grating covering the wavelength are of the sensor grating, where the reflected signal from the sensor grating and the receiver grating goes into a separate detector through a coupler. The detector signal is maximized using strain modulation of the receiver grating and feedback from the detector to the actuator adjusting the receiver grating. The actuator force will then be a measure for the Bragg wavelength of the sensor grating. This technique also implies significant optical losses in a wavelength multiplexed system as several fiberoptic couplers must be used. In addition one detector is required for each sensor.

Optical communication systems and optical networks uses in an increasing degree wavelength multiplexing for increasing the transmission capacity, which means that signals are transferred using a number of narrow banded semiconductor lasers with different optical wavelengths/frequencies separated typically by 50–200 GHz which may be transferred simultaneously along an optical fiber. In such systems simple, compact optical spectrum analysers may be used to measure important parameters such as laser wavelength, optical power and optical signal/noise ratio (spectral power in the centre of a laser line relative to a spectral power in a side band) in the different wavelength channels at a number of positions within the optical network.

SUMMARY OF THE INVENTION

The main object of this invention is to provide an inexpensive and practical device with a minimum of components, minimum optical loss and only one detector for accurate measuring of reflected Bragg wavelengths from one or more wavelength multiplexed fiber Bragg gratings being illuminated by a broad band optical source. It is also an object to this invention to provide an inexpensive and practical device with a minimum of components, minimal optical loss and only one detector for accurate measuring of laser wavelengths, optical power and optical signal/noise ration in the different optical channels of a wavelength multiplexed optical communication system.

The objects of the invention is obtained with a device with properties as specified in the characterizing part of claim 1. Additional properties are specified in the dependent claims.

The invention consists of using as a readout system for optical wavelengths, for example the Bragg wavelengths of one or more fiber Bragg gratings with different Bragg wavelengths, hereafter called sensor gratings, a pulsed broadband source, typically a light emitting diode, in a combination with an optical directional coupler and one I detector, and with separate analyses filters for each grating overlapping the grating spectrally, the analyses filters being based upon one or more fiber Bragg gratings. The analyses filters are positioned along an optical fiber with fiber delay lines (with fiber lengths in the range of 100 m) between each receiving grating, so that the reflected signals with different wavelengths for each sensor grating may be separated in time.

The analysis filter may consist of one Bragg grating which may be adjusted in wavelength using an actuator to lock on the same wavelength as the corresponding sensor grating. When the analysis filter and the sensor filter overlap the corresponding reflected pulse will have maximum power. The actuator force will in this case be a direct measure of the Bragg wavelength of the sensor grating. The actuator may be based on strain control or temperature in the analysis grating.

Alternatively the analysis filter may consist of to fibres being separated by a fiber delay line, where the two analysis gratings are partially overlapping spectrally and where the two Bragg wavelength of the sensor grating will be between the (flanks of) the two analysis gratings. The ratio between the reflected pulses from the two analysis gratings will thus be an indication of the spectral position of the sensor grating relative to the analysis gratings. The analysis gratings will have a constant temperature or a known, varying temperature. The analysis gratings may also be adjusted with an actuator based on controlled and known change of strain or temperature, to increase the measuring range.

The device according to the invention may also be used precise measuring of laser wavelengths, optical power and optical signal/noise ratio in the different wavelength channels in a wavelength multiplexed optical communication system, as laser light with different wavelengths from an optical communication fiber is retrieved through an optical coupler and sent through an optical switch, preferably with less than 1 $\mu$s switching time, which pulses the light before it is sent through a directional coupler to a fiber with separate analysis filters for each wavelength channel overlapping spectrally the wavelength channel, the analysis filters being based on one or more Bragg gratings. The analysis gratings are positioned along one fiber with fiber delay lines, for example a the 100 m range, between each receiver grating, so that the reflected signals with different wavelengths for each wavelength channel may be separated in time.

BRIEF DESCRIPTION OF THE SEVERAL VIEWS OF THE DRAWINGS

The invention will be described below using exemplified embodiments and with reference to the illustrations, in which FIG. 1 shows a wavelength measuring device for multiplexing and demodulation of several FBG sensor wavelengths based on one analysis grating per sensor grating, FIG. 2 shows an alternative wavelength measuring device for demultiplexing an demodulation of several FBG sensor wavelengths based on two analysis grating per sensor grating, FIG. 3a and FIG. 3b)

DETAILED DESCRIPTION OF THE PREFERRED EMBODIMENTS

Figure 3A:
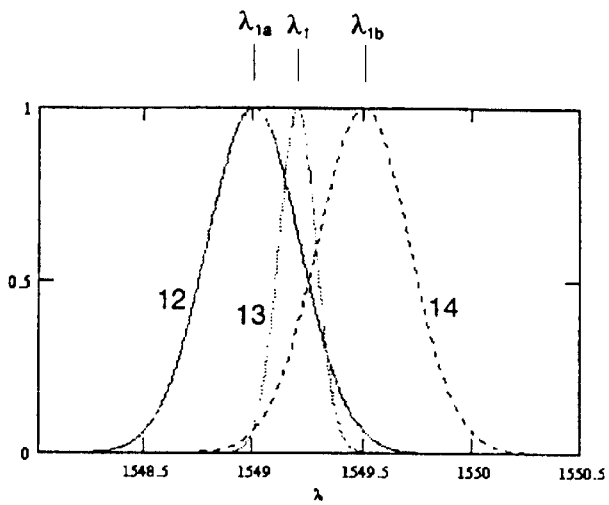
FIG. 3a shows an example of the reflection spectra from a sensor grating and a corresponding analysis grating pair in the wavelength measuring device shown in FIG. 2.
Figure 3B:
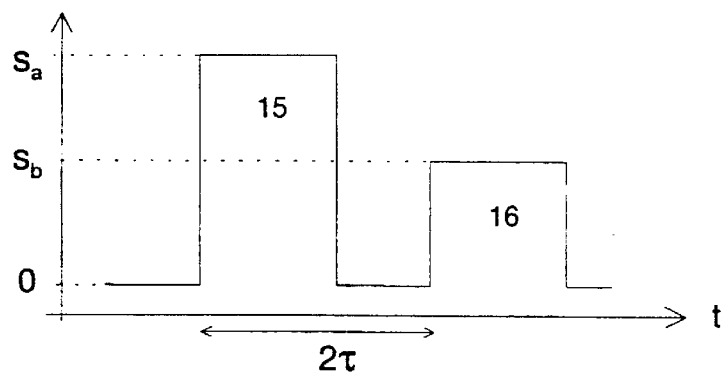
FIG. 3b shows reflected pulses from an analysis grating pair with a fiber delay line between the gratings.

FIG. 1 shows a preferred embodiment if the wavelength measuring device in a system for measuring Bragg wavelengths in a number of wavelength multiplexed FBGs. The light from the modulator which here is constituted by a pulsed broadband source 1 passes through a fiberoptic directional coupler 2 and is reflected from one or more FBGs, hereafter called sensor gratings, with different Bragg wavelengths $\lambda 1$–$\lambda n$ (n=3) within the source spectrum. The reflected pulses from the different gratings pass through the directional coupler 2 and are lead to one or more analysing filters, each comprising an analysis grating 4 with a Bragg wavelength $\lambda a1$–$\lambda an$ (n=3), one per sensor grating, separated by a fiber delay line 5 (having a length in the range of 100 m) with an optical time delay in front of each analysis grating, so that the reflected pulses with different wavelengths from each analysis grating 4 is separated in time with a time separation between each pulse being 2T. The time difference between the sensor gratings 3 is here considered to be very small. The time separation between the reflected pulses may easily be chosen by changing the length of the delay fiber 5, so that overlapping between the different reflected signals is avoided.

The broad band source 1 is adapted to pulse the light with a distance between the pulses corresponding to the maximum time delay through the device according to the invention, thus to avoid overlapping of reflected signals with different wavelengths on the detector.

The analysis gratings 5 are preferably kept in a controlled environment, so that their reflection properties does not change because of external influences.

The generated pulse train is lead through the directional coupler 2 to a detector 6 and the electrical signals are sampled and processed in a signal processing unit 7. The wavelengths of the analysis gratings 4 may be changed using actuators 8 changing the strain and/or temperature in the gratings. When the analysis grating wavelength overlaps the corresponding sensor grating wavelength the power of the corresponding reflected light pulse on the detector will have a maximum. Then the actuator force may be a direct measure of the sensor grating wavelength.

The system may operate in an open loop configuration where the analysis grating wavelength is scanned over corresponding sensor grating wavelengths and the reflected intensity is compared to the forced change in the analysis grating.

Alternatively the analysis gratings are kept in a closed loop configuration where they are locked to the corresponding sensor grating wavelength using feedback 8' from the signal processing unit 7 to the actuators 8.

FIG. 2 shows another preferred embodiment of a wavelength measuring device used for measuring the Bragg wavelengths of several wavelength multiplexed FBGs. The light from a pulsed broadband source 1 passes through a fiberoptic directional coupler 2 and is reflected from one or more FBGs 3, here called sensor gratings, with different Bragg wavelengths $\lambda 1-\lambda n$ (n=3) within the source spectrum. The reflected pulses from the different gratings pass through the directional coupler 2 and are lead to one or more analysis grating pairs separated by fiber delay lines 5 with time delays T1 Each grating pair consists of two gratings 9a, 9b with Bragg wavelengths $\lambda na$ and $\lambda nb-$(n=1,2,3), wherein the gratings are separated by a fiber delay line 10 with a time delay T. The two analysis gratings have reflection spectra 12, 14 as shown in FIG. 3a, with partially overlapping and the reflection spectrum 13 of the sensor grating will be between (on the flanks on the two analysis gratings, The ratio between the amplitudes Sa and Sb of the analysis gratings with time separation 2T, corresponding to the two analysis gratings, will thus be a direct expression for the position of the sensor grating relative to the analysis gratings, and thus the Bragg wavelength of the sensor grating.

Figure 3C:
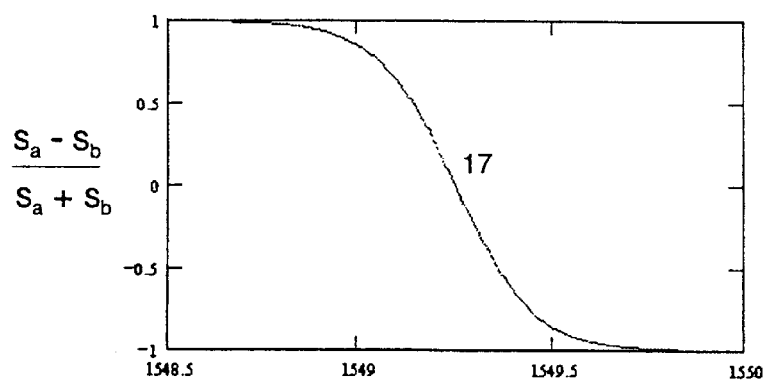
FIG. 3c shows the relative intensity difference between two reflected pulses from an analysis grating pair as a function of sensor grating wavelength (ref.

FIG. 3c shows relative intensity difference, defined as (Sa−Sb)/(Sa+Sb) between the two reflected pulses from an analysis grating pair as a function of sensor grating wavelength and relative intensity difference.

The reflected pulse pairs from the analysis gratings are lead through the directional coupler 2 to a detector 6, and the electrical signals are sampled and processed in a signal processing unit 7 in which the calibration data for each sensor grating and corresponding analysis grating pairs are stored. The analysis gratings will have a constant temperature or a varying, known temperature. In this case the measuring device will have a very short refreshing time, typically a millisecond or less, but the measuring range will be limited by the flank width of the analysis gratings. The measuring range may be increased by increasing the flank width on the expense of the measured dissolving power. The analysis gratings may be adjusted using actuators, based on controlled and known changes in temperature or strain, to increase the measuring range. The system may either operate in an open loop configuration, or in a closed loop configuration in which the analysis gratings are locked to the corresponding sensor grating wavelengths using feedback 8' from the signal processing unit 7 to the actuators 8, for example by demanding that the amplitudes of the two reflected pulses are equal.

Figure 4:
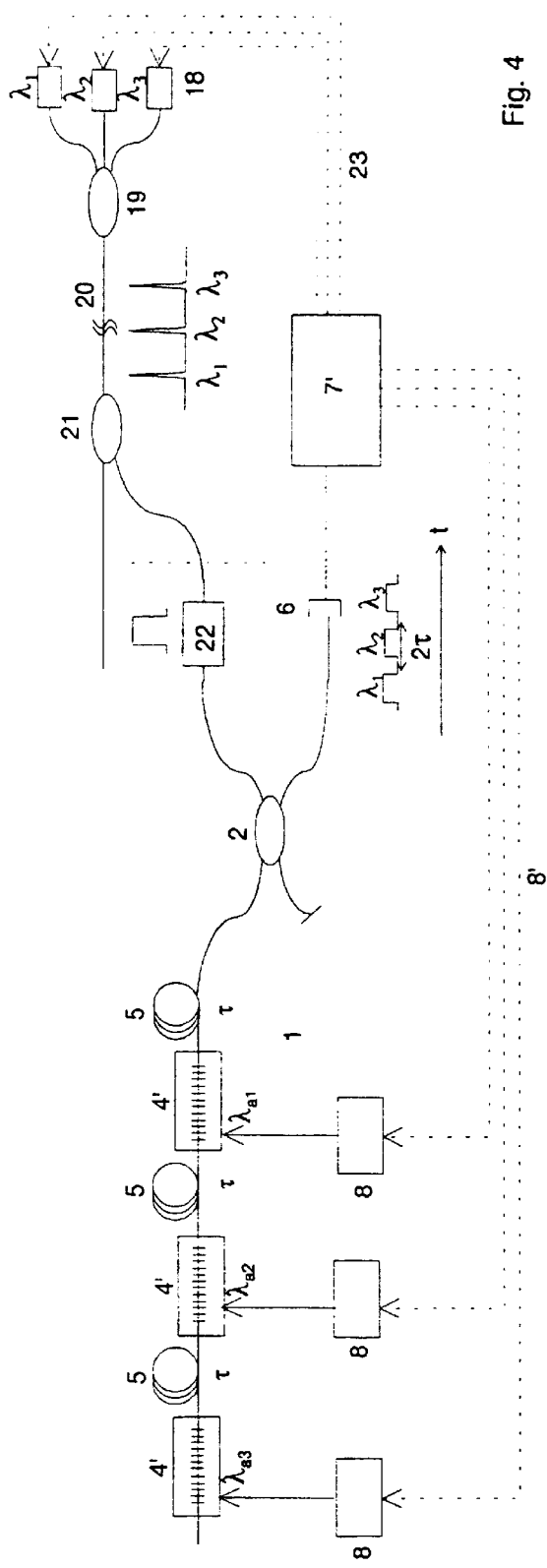
FIG. 4 shows a device for measuring wavelength, optical power and signal/noise ratio in several wavelength multiplexed laser sources, as well as possible control of the laser wavelengths, based on one analysis grating per laser wavelength.

FIG. 4 shows the invention as described with reference to FIG. 1 used to measure wavelength, optical power and signal/noise ratio of a number of wavelength multiplexed laser sources, as well as possible control the laser wavelengths. The light from several narrow banded laser sources 18 with different wavelengths are multiplexed using a wavelength multiplexer 19 in an optical communication fiber 20. In a random position in the fiberoptic network some of the light is retrieved using a fiberoptic directional coupler 21 and lead into the device. The light passes a modulator being constituted by an optical switch 22 with switching times less than 1 ps, pulsing the light before it is sent through a directional coupler 2 to one or more analysis gratings 4 with Bragg wavelengths $\lambda a1-\lambda an$ (n=3) with an optical delay line 5, usually with a length of approx. 100 m, with an optical time delay a in front of each analysis grating, so that the reflected pulses with different wavelengths from each analysis grating 4 may be separated in time by 2T. The generated pulse train is lead through the directional coupler 2 to a detector 6 and the electrical signals are sampled and processed in a signal processing unit 7'. The wavelengths of the analysis gratings 4 may be changed using actuators changing the forced strain and/or the temperature of the gratings.

Figure 6A:
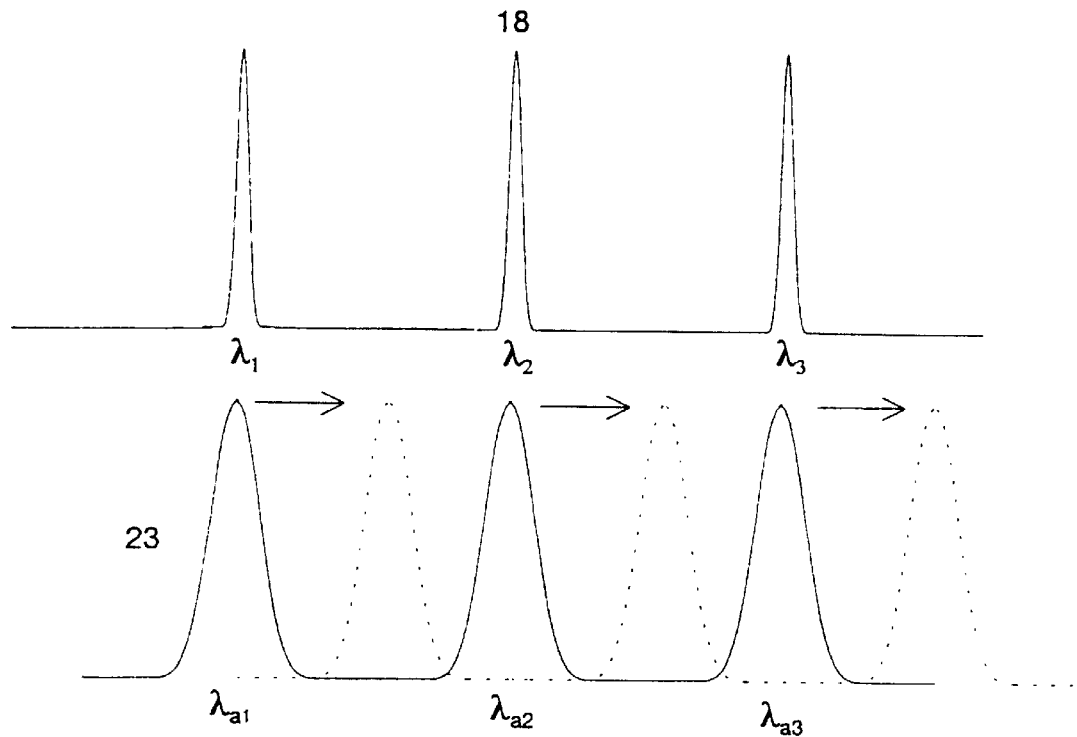
FIG. 6a illustrates how the use of one analysis grating per wavelength may be used to measure signal/noise ratios for a number of wavelength multiplexed lasers.

When the analysis wavelength overlaps the corresponding laser wavelength the poser in the corresponding reflected light pulse will have a maximum at the detector. Then the actuator force will be a direct measure of the laser wavelength. Measured power will be a measure for the laser power. Relative power between the different lasers will be given by the relative power between the pulses. For absolute, accurate power measurements one of the lasers may be a reference with known power. The signal/noise ratio may be measured by changing the actuator force so that the grating wavelengths 23 are exchanged with one of the side bands in the laser spectra 18, as is illustrated in FIG. 6a. Measured power (pulse amplitude) when the grating overlaps the laser wavelength and the when the grating is positioned at a distance from the laser wavelength, will be a measure of the signal/noise ratio. The system may then operate in an open loop configuration, or in a closed loop configuration with feedback 8' from the signal processing unit 7' to the actuators 8. The system may also be used to control and lock the wavelengths of the laser sources through the feedback 23 from the signal processing unit 7' to the lasers 18.

Figure 5:
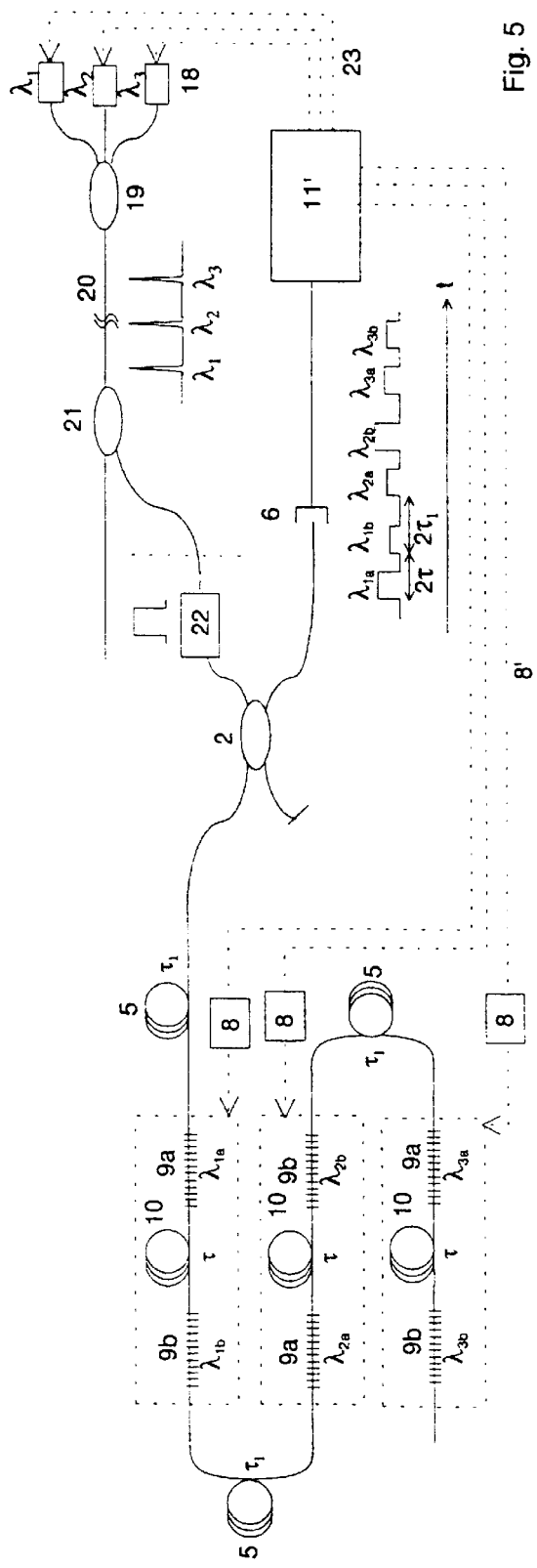
FIG. 5 shows an alternative embodiment for measuring of wavelength, optical power and signal/noise ratio for several wavelength multiplexed laser sources, as well as possible control of their wavelengths, based on two analysis gratings per laser wavelength.
Figure 6B:
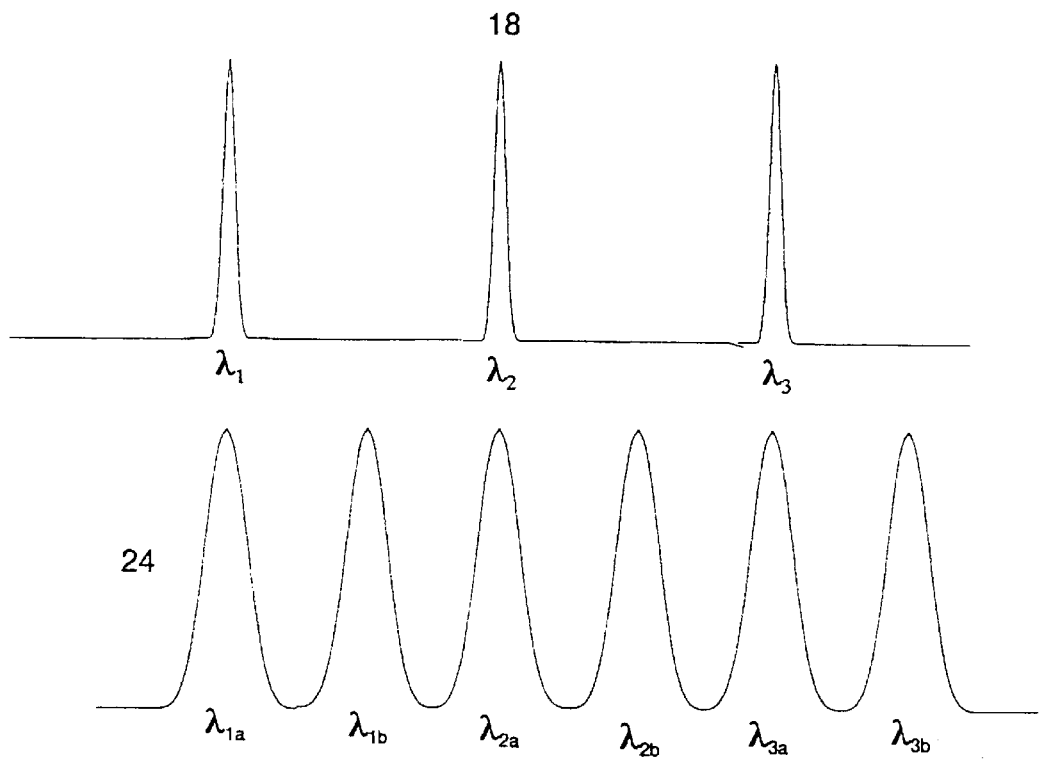
FIG. 6b illustrates how use of two analysis gratings per wavelength may be used for measuring signal/noise ratios for several wavelength multiplexed lasers.

FIG. 5 shows an embodiment of the device according to the invention corresponding to the one referred to in FIG. 2, wherein it is adapted to measure wavelength, optical power and signal/noise ratio of a number of wavelength multiplexed laser sources, as well as making it possible to control the laser wavelengths. The light from several narrow banded laser sources 18 with different wavelengths are multiplexed, using a wavelength multiplexer 19, into a communication fiber 20. In a random position in the optical network some of the light is retrieved using a fiberoptic directional coupler 21 and lead into the abovementioned device according to the invention. The light passes an optical switch or modulator 22 with switching times typically below 1 μs, pulsing the light before it is lead through an optical directional coupler to a number of analysis gratings, each comprising a grating pairs for each wavelength being separated by a fiber delay line 5 with a time delay a. The generated pulse train is lead through the directional coupler 2 to a detector 6 and the optical signals are sampled and processed in a signal processing unit 11'. The wavelengths of the analysis gratings 4 may be changed using actuators 8 changing the strain and/or the temperature in the analysis gratings. When the analysis grating wavelength λna of the first grating 9a in the analysis filter 10 corresponds to the corresponding laser wavelength the power in the reflected light pulse on the detector 6 will have a maximum. Then the actuator force will be a direct measure of the laser wavelength, and measured power will provide a measure of the laser output power. The wavelength λnb in the second analysis grating has a constant distance from λna, so that the amplitude of the pulse reflected from the second grating 9b with wavelength λnb relative to the amplitude of the pulse reflected from the grating with wavelength λna provides a direct measure of the signal/noise ratio. FIG. 6b shows the laser spectra 18 relative to the analysis wavelength spectra 24 in this case. The system may either operate in an open loop configuration, or in a closed loop configuration with feedback 8' from the signal processing unit 7' to the actuators 8. The system may also be used to control and lock wavelengths of the laser sources through feedback 23 from the signal processing unit 11' to the lasers 18.

Even if the invention here has been described with reference to realistic examples it is evident that it may be used for analysing a number of different optical signals being constituted by a number of essentially delimited wavelength ranges, where the analysis filters may be adapted to each of the wavelength ranges being used to inspect the power distribution, the changes in the wavelengths and the signal/noise ratios of the received optical signals.

It is evident that the number of gratings in the analysis filters, and intermediate delay fibres, may be increased, e.g. to measure wavelength, optical power for several wavelength multiplexed lasers without having to determine the wavelength of the analysis gratings. This may be done using three analysis gratings with delay lines providing three reflected pulses per laser. Two gratings with known temperature are used to determine the wavelength, as described in relation to FIG. 2, and the amplitudes of the two reflected pulses from the gratings will also provide sufficient information to determine the signal power. A third grating with a known temperature may be used as discussed in relation to FIG. 5 to measure the power level in the side band so that the signal/noise ratio may be measured.

The number of gratings in the analysis filters, and intermediate delay fibres, may also be used for other purposes, such as measuring skewness in the intensity distribution of the incoming signal.

What is claimed is:

1. Fiberoptic device for accurate and repeatable measurements of wavelengths in light comprising one or more wavelength ranges, characterized in that it comprises a directional coupler adapted to transmit the light of unknown wavelengths to be measured into an optical fiber, said optical fiber containing at least one analysis filter for each wavelength range, each analysis filter being kept in a controlled environment, and each analysis filter consisting of at least one unique, fiberoptic Bragg grating (FBG) in which each Bragg grating has a chosen wavelength and reflects incoming light back through said directional coupler into a detector with a corresponding signal processing unit, each analysis filter extracting one wavelength range being unique for the filter, that the device comprises a modulator device for pulsing the incoming light with a chosen pulse width, and where the device comprises an optical fiber delay line before each analysis grating with a length being adapted to provide sufficient time delay, larger than the pulse width so that the reflected pulses from each analysis filter with different wavelengths are separated in time and thus demodulated in the signal processing unit.

2. Fiberoptic device according to claim 1, characterized in that at least one analysis filter consists of at least one FBG being adjustable in wavelength using an actuator, preferably based on control of strain or temperature in the analysis gratings for scanning over corresponding sensor grating wavelengths.

3. Fiberoptic device according to claim 2, characterized in that at least one analysis grating comprises a closed loop configuration adapted to lock it to the corresponding wavelength area, as the detector and signal processing unit is adapted, as a function of the known delay line, to measure the intensity of the signal reflected from the analysis grating, and that the signal processing unit is adapted to control the grating wavelength of the analysis grating for obtaining maximum intensity in the reflected signal, the controlled change in the analysis grating thus providing a measure of the reflected wavelength.

4. Fiberoptic device according to claim 1, characterized in that at least one analysis filter consists of two FBGs separated by a fiber delay line where the two analysis gratings have the same, constant temperature or a varying, known temperature, or are adjusted using an actuator with known force and response, so that the reflected pulses from the two gratings in an analysis grating pair may be separated in time, and where the two analysis gratings have a partial spectrum overlapping and where the corresponding wavelength is between, and on the flanks of, the two analysis grating spectra, so that measuring of the amplitudes of the reflected pulses from the two analysis gratings provide an indication for the Bragg wavelength of the corresponding sensor grating.

5. Fiberoptic device according to claim 1, characterized in that the modulator is adapted to pulse the light with a distance between the pulses corresponding to the maximum time delay through the device, thus to avoid overlapping of reflected signals with different wavelengths on the detector.

6. Measuring system comprising a fiberoptic device as described in claim 1, for measuring the influence on at least one fiberoptic sensor, said sensor comprising at least one Bragg grating from which the reflected wavelength provides an indication of an external influence, the Bragg gratings being coupled to the directional coupler of the fiberoptic device, characterized in that the modulator is constituted by a pulsed light source adapted to emit light within a chosen range of wavelengths corresponding to the reflection wavelengths of the sensor gratings, and that the system comprises one analysis filter assigned to the reflection wavelength of each sensor grating.

7. Measuring system comprising a fiberoptic device as described in claim 6, wherein said indication of an external influence is selected from the group consisting of changes in temperature or mechanical pressure.

8. Measuring system comprising a fiberoptic device as described in claim 1 for measuring the optical characteristics of a fiberoptic network comprising a number of wavelength multiplexed light source, the fiberoptic device being coupled to the network with the directional coupler, characterized in that it comprises a modulator for pulsing the signal from the fiberoptic network and that the measuring system comprises an analysis filter assigned to the wavelength of each of the light sources.

9. Measuring system according to claim 8, characterized in that it comprises a control device coupled to the signal processing unit adapted to adjust the wavelength of the light sources and/or the intensity based on the measured values.

10. Measuring system comprising a fiberoptic device as described in claim 8, wherein said optical characteristic is selected from the group consisting of wavelength, optical power and signal/noise ratio.

* * * * *